(No Model.) 2 Sheets—Sheet 1.

A. RECKENZAUN.
DYNAMO ELECTRIC MACHINERY.

No. 385,068. Patented June 26, 1888.

Attest:
Henry Drury
E. W. Brickwood

Inventor:
Anthony Reckenzaun.
By his atty (No Model.) 2 Sheets—Sheet 2.
A. RECKENZAUN.
DYNAMO ELECTRIC MACHINERY.
No. 385,068. Patented June 26, 1888.
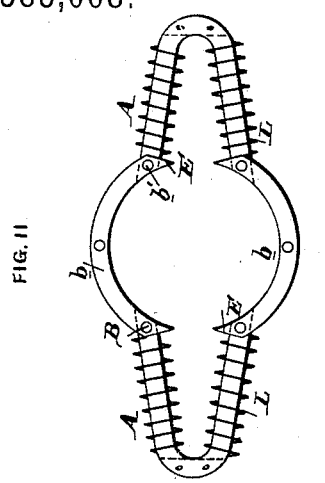
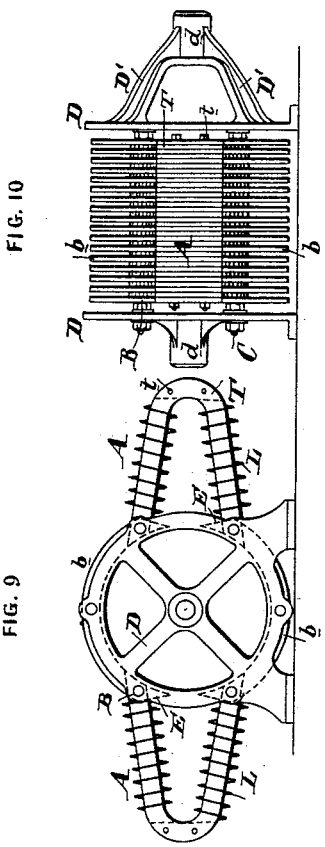
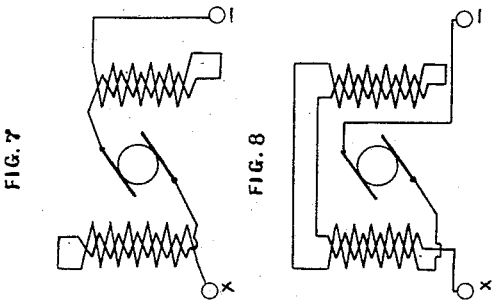
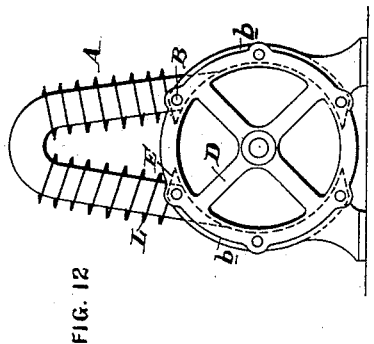
Attest: Inventor:
Henry Drury Anthony Reckenzaun
E. W. Brickwood By his atty

UNITED STATES PATENT OFFICE.

ANTHONY RECKENZAUN, OF LONDON, ENGLAND, ASSIGNOR TO THE ELECTRIC CAR COMPANY OF AMERICA, OF PHILADELPHIA, PENNSYLVANIA.

DYNAMO-ELECTRIC MACHINERY.

SPECIFICATION forming part of Letters Patent No. 385,068, dated June 26, 1888.

Application filed March 29, 1888. Serial No. 268,905. (No model.) Patented in England March 20, 1885, No. 3,599.

*To all whom it may concern:*

Be it known that I, ANTHONY RECKENZAUN, of London, England, have invented an Improvement in Electric Motors, of which the following is a specification.

My invention has reference to electric motors and dynamo-electric machines; and it consists in certain improvements, all of which are fully set forth in the following specification and shown in the accompanying drawings, which form part thereof.

This invention is partly set out and claimed in English Patent No. 3,599, granted to me on March 20, 1885; but many of the improvements herein set out are not found in said patent.

Figure 3:
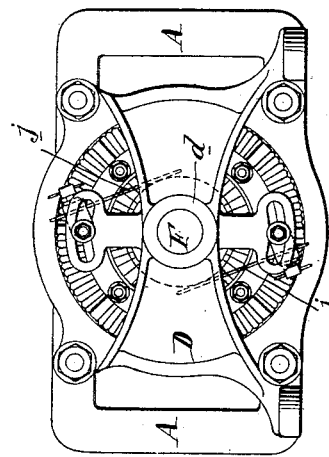
Figure 4:
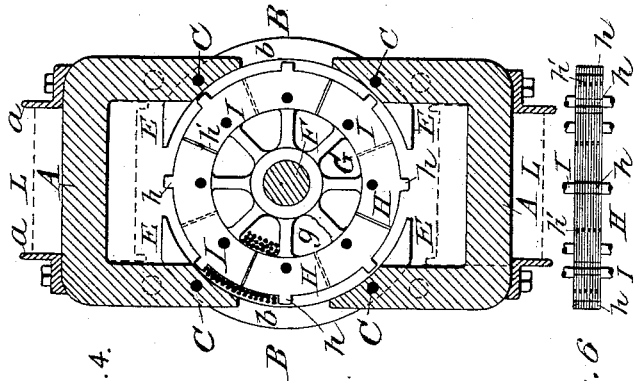
Figure 6:
Figure 1:
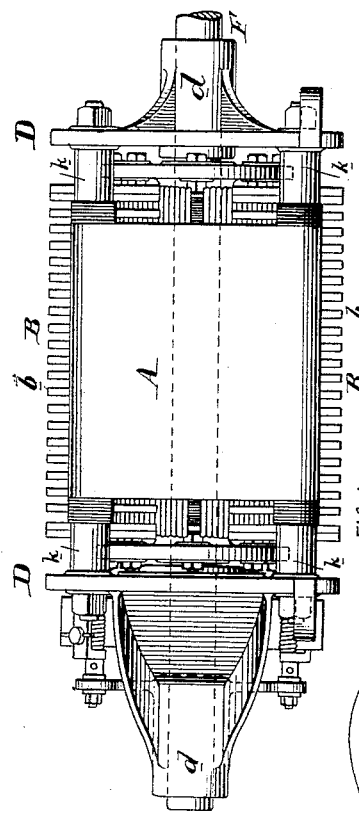
Figure 2:
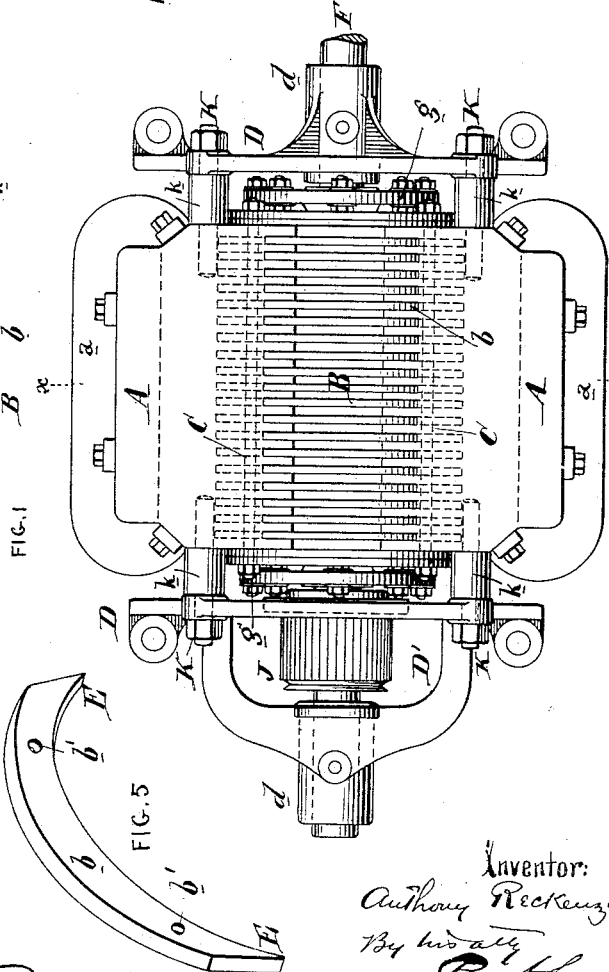
Figure 5:
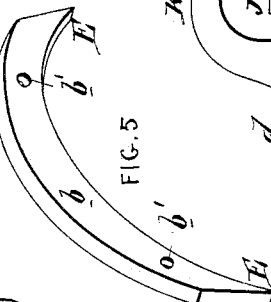

In the drawings, Figure 1 is a side view of my improved and preferred type of motor or dynamo-electric machine with the field-coils removed. Fig. 2 is a plan view of same. Fig. 3 is an end view of same. Fig. 4 is a cross-section of same on line $x\,x$ of Fig. 2. Fig. 5 is a perspective view of one of bridging polar pieces removed. Fig. 6 is an elevation of a small portion of the armature-core. Figs. 7 and 8 are diagrams showing the winding of the motor. Fig. 9 is a side elevation of a modified form of motor. Fig. 10 is an end view of same; and Figs. 11 and 12 are side elevations of modified forms of my invention.

My invention embodies, among other points, peculiarities in the construction of the field-cores and armature-core, including many details of construction. In the type of motor or dynamo I prefer there are two equal field-magnets of the horseshoe type whose poles are arranged toward each other to inclose the armature. These field-magnet cores I may make of solid metal, preferably soft iron, or form them of thin bars or plates arranged parallel and secured rigidly together and to the non-magnetic end frames in which the armature-shaft is journaled. The horseshoe-magnets I make without a joint at the neutral part, and in the preferred form the neutral part of the magnet is within the coils.

In a well-designed dynamo or motor there should be little or no magnetism at the neutral part of the field-magnets, usually called the "yoke." In order to prevent the formation of magnetic poles at the joint, the before-mentioned yokes are made of large sectional area and their contact-surfaces are made as true as possible. This, however, involves a considerable amount of accurate work without entirely obviating the formation of poles where they are not required and where they are injurious, and the weight of the yokes is objectionable in electromotors intended for locomotive purposes. I therefore dispense with joints in the field-magnets where the neutral part occurs and unite the two opposite field-magnets at their north and south polar extensions, as will be fully explained hereinafter.

A A represent the two U or horseshoe shaped field-magnets, which may be made each of one solid forging, or cast, as shown in Figs. 1 to 4, or of a series of parallel plates, as indicated in Figs. 9 to 12, the former being cheaper, but the latter having the advantage of lightness. The north and south poles of the two magnets are arranged toward each other, but not so as to touch, and are connected at B by a series of small curved bridging-pieces, $b$, which are let into notches or slots formed in the polar pieces of the field-magnets, as shown in Figs. 2 and 4. These bridge-pieces $b$ are preferably of magnetic material, such as iron, and have their ends or points E extended beyond the poles of the field-magnets, as shown clearly in Fig. 4. The object of these extensions is to give an extended pole-piece to the magnets A A.

The parts E are very important in producing the field, but the bridge parts $b$ are of little or no use, being at the neutral part, so far as the flow of the magnetic lines of force is concerned. The function of the bridge-pieces is essentially to enable the rigid connection to be made between the field-magnets, and yet admit of ventilation. It is evident that the parts E might be formed integral with the field-magnets, if desired. Bolts C pass through the poles of the magnets and holes $b'$ in the bridging-pieces $b$, and thus unite them rigidly together, making a good magnetic contact. The slots or notches in the poles are milled out, and the bridge-pieces $b$ are milled to fit the notches tightly. The pieces $b$ on the north and south poles are arranged in opposite directions, and, being curved, form an open-work cylinder, within which the armature rotates.

D D are two end frames or brackets of non-magnetic material, such as gun-metal, and are formed with the bearing $d$ for the armature-shaft F. The frame D, which surrounds the commutator J, is formed with extending arms D', to give space to arrange the brushes $j$ and locate the commutator. These brackets D D are supported at a short distance from the field-magnets by sleeves $k$, and are secured by bolts or screws K, which enter the four polar extensions of the field-magnets A. The brackets hold the field-magnets rigid and prevent the slightest displacement. If it were not for these end brackets of non-magnetic metal the magnets A A would have every opportunity to get out of line, working on the bridge-pieces $b$ as links. L are the field-coils, and are arranged upon the vertical parts of the field-magnets A and over what is usually the yoke parts. The outer parts of the cores are provided with brass plates $a$, to hold the coils L in position and improve the appearance of the motor or dynamo. A glance at Fig. 4 will show that in my construction I make the diameter of the armature large and about equal to the full spread of the field-magnets. The armature is of the Gramme type, but the novelty consists in the core thereof. It was customary in my motors formerly made to make the core of the armature of stamped sheet-iron sections thoroughly annealed, and then thread them upon bolts, which were fastened at the ends to brass wheels secured to the armature-shaft; but in that case the curved core-sections only lapped just sufficient to unite with the bolt, and hence there was much space between the segments. In this construction I employ the same general principle; but I form the sections H of annealed sheet-iron of the shape shown in Fig. 4—that is, with the polar extensions $h$ directly over the bolt-holes and the ends extended beyond the bolt-holes so as to almost touch the next segment in the same plane or ring, leaving but small apertures $h'$ for air-currents. These air-spaces $h'$ are under the coils, and by the action of centrifugal force tend to cause a draft from within the armature outward, and are amply sufficient. In this construction of armature-core all of the available space is employed by the metal, and hence I obtain the maximum of magnetic effect.

The segments of the core are insulated from each other by layers of paper, also stamped out, and of exactly the same shape as the segments themselves, to prevent cross or Foucault currents. The polar extensions $h$ extend beyond the body of the core and run in close proximity to the poles of the field-magnets. The bolts I are preferably wrapped with paper, or otherwise insulated, and clamp the core to the end wheels or disks, G, of brass or other non-magnetic material, secured fast to the armature-shaft, and provided with arms or spokes $g$, to allow circulation of air and wire-connections with the commutator. The coils of the field-magnets are preferably two coils on each horseshoe-core in Fig. 4 and four coils on each horseshoe-core such as is in Figs. 9, 11, and 12, and these coils are usually of equal resistance and wound one on top of the other. It is necessary to couple these coils in a manner that the resistance on each field-magnet will be the same, or the machine would become unevenly balanced as to its magnetic distribution.

In Figs. 7 and 8 I show the customary way of coupling up the coils, and, as a rule, I prefer to connect the field-coils in series with the armature, or make the machine of the series type when the motor is to be used for traction purposes, where the electro-motive force of the current supplies is fixed and the current varies—that is, on a constant potential circuit. In Fig. 7 the field-coils on one leg are coupled in series, and are in series with the armature and with the two coils on the other leg, while in Fig. 8 the two inner coils of the two legs are connected in series and arranged in series with the two outer coils and armature.

It is evident that the coupling up may be made to put the armature in shunt relation to the field-coils to make a shunt-wound machine; or, if desired, the winding may be so as to make a compound machine.

In Figs. 9 to 12 the field-magnets are shown as formed of flat bars or plates, which are separated at the pole ends by the bridge-pieces $b$, and at the neutral parts I may place intermediate spacing-pieces, T, which are clamped together with the plates forming the cores by bolts $t$. This will leave air-spaces between the laminæ so formed and allow circulation of air.

If desired, the plates or bars may be clamped tightly together throughout their entire length by extending the distance-pieces to the bridge-pieces $b$. In this case we would have just what is shown in Figs. 1 to 4.

I do not limit myself to the minor details of construction, as it is evident that they may be modified in various ways without departing from the spirit of my invention.

Having now described my invention, what I claim as new, and desire to secure by Letters Patent, is—

1. In an electric motor or dynamo, a field-core having its polar ends united to polar extensions by bolted connections, in combination with a rigid frame to hold said field-cores and polar extensions rigidly in position to form the armature-space.

2. In an electric motor or dynamo, a field-core having its polar ends united to polar extensions by bolted connections, in combination with a rigid frame of non-magnetic material to hold said field-cores and polar extensions rigidly in position to form the armature-space.

3. In an electric motor or dynamo, a field-core having its polar ends united to polar extensions by bolted connections, in combination with a rigid frame of non-magnetic material on each end to hold said field-cores and polar extensions rigidly in position to form the armature-space.

4. In an electric motor or dynamo, a field-core having its polar ends united to polar extensions by bolted connections, in combination with a rigid frame of non-magnetic material on each end to hold said field-cores and polar extensions rigidly in position to form the armature-space, the armature, and the armature-shaft supported by the end frames.

5. In an electric motor or dynamo, a field-core having its polar ends united to polar extensions by bolted connections, in combination with a rigid frame of non-magnetic material on each end to hold said field-cores and polar extensions rigidly in position to form the armature-space, the armature, the armature-shaft supported by the end frames, a commutator on said armature-shaft, a brush-holder supported by said end frames, and brushes carried by said brush-holders.

6. In an electric motor or dynamo, a field-core made without yoke-joints and of horseshoe or U shape, having its polar ends united to polar extensions by bolted connections, in combination with a rigid frame to hold said field-cores and polar extensions rigidly in position to form the armature space.

7. In an electric motor or dynamo, a field-magnet core of horseshoe shape made in continuous metal from pole to pole, in combination with pole pieces or extensions, and rigid frames to hold said pole-pieces and cores in a fixed relative position.

8. In an electric motor or dynamo, a field-magnet core of horseshoe shape made in continuous metal from pole to pole, with air-spaces, in combination with pole pieces or extensions and rigid frames to hold said pole-pieces and cores in a fixed relative position.

9. In an electric motor or dynamo, a field-magnet core of horseshoe shape made in continuous metal from pole to pole, in combination with a series of sections making up the pole pieces or extensions and forming the armature-space, said sections of each pole being separated laterally by air-spaces, and rigid frames to hold said pole-pieces and cores in a fixed relative position.

10. In an electric motor or dynamo, a field-core having its polar ends united to polar extensions formed of small pieces curved on their inner edges to form the armature-space, in combination with end frames forming standards and rigidly holding the parts together in a fixed relation.

11. In an electric motor or dynamo, a field-core having its polar ends united to polar extensions formed of small pieces extending toward each other from pole to pole and curved on their inner edges to form the armature-space, in combination with end frames forming standards and rigidly holding the parts together in a fixed relation.

12. In an electric motor or dynamo, the combination of two horseshoe or U shaped field-magnets having the polar extensions, such as E, extending toward each other and with their similar poles arranged in line, and frames exterior to the field-magnets forming standards and bolted or secured to said field-magnet cores to hold them in a fixed relation to each other.

13. In an electric motor or dynamo, the combination of two horseshoe or U shaped field-magnets having the polar extensions, such as E, a series of pointed projections of flat metal with interposed air-spaces extending toward each other and with their similar poles arranged in line, and frames exterior to the field-magnets forming standards and bolted or secured to said field-magnet cores to hold them in a fixed relation to each other.

14. In an electric motor or dynamo, the combination of two horseshoe or U shaped field-magnets having the polar extensions, such as E, extending toward each other and with their similar poles arranged in line, and frames of non-magnetic material exterior to the field-magnets forming standards and bolted or secured to said field-magnet cores at each end, to hold them in a fixed relation to each other.

15. In an electric motor or dynamo, the combination of two horseshoe or U shaped field-magnets having the polar extensions, such as E, extending toward each other and with their similar poles arranged in line, frames exterior to the field-magnets forming standards and bolted or secured to said field-magnet cores to hold them in a fixed relation to each other, and bridging-pieces extending between the similar poles of the two field-magnets.

16. In an electric motor or dynamo, the combination of two horseshoe or U shaped field-magnets having the polar extensions, such as E, extending toward each other and with their similar poles arranged in line, frames exterior to the field-magnets forming standards and bolted or secured to said field-magnet cores to hold them in a fixed relation to each other, and bridging-pieces extending between the similar poles of the two field-magnets and formed of a series of parallel plates with air-spaces between them.

17. In an electric motor or dynamo, a field-magnet core formed with ductile magnetizable polar extensions bolted to it in grooves at its polar ends.

18. In an electric motor or dynamo, a field-magnet core formed of a ductile magnetizable metal and provided with ductile magnetizable polar extensions bolted to it in grooves at its polar ends.

19. In an electric motor or dynamo, a field-magnet core formed of a ductile magnetizable metal continuous or without yoke-joints and provided with ductile magnetizable polar extensions bolted or otherwise secured to them at their polar ends.

20. In an electric motor or dynamo, two U-shaped field-magnet cores having their similar poles arranged toward each other, in combination with bridging-pieces extending between similar poles to unite them, but separate from the field-magnet cores, and end frames forming standards and holding the field-magnet cores in position.

21. In an electric motor or dynamo, two U-shaped field-magnet cores having their similar poles arranged toward each other, in combination with bridging-pieces extending between similar poles to unite them, but of much smaller sectional area than the field-cores, and end frames forming standards and holding the field-magnet cores in position.

22. In an electric motor or dynamo, the combination of two field-magnets of U shape, having their similar polar ends opposed, brought close to the armature, and united by parallel bridging-pieces, substantially as set out, set down into the polar ends, and secured therein by bolts passing through said polar ends and bridging-pieces.

23. In an electric motor or dynamo, the combination of two field-magnets of U shape, having their similar polar ends opposed, brought close to the armature, and united by parallel bridging-pieces, substantially as set out, set down into the polar ends, and secured therein by bolts passing through said polar ends and bridging-pieces, and end frames directly secured to the field-magnet cores to hold the parts rigidly together.

24. The combination, in a motor or dynamo, of two U or horseshoe shaped field-magnets placed opposite each other, and each formed of a continuous band of metal from pole to pole, avoiding yoke-joints, and uniting bridging-pieces connecting similar poles of said field-magnets together by being set in grooves in their ends and made flush with the surface thereof.

25. The combination, in a motor or dynamo, of two U or horseshoe shaped field-magnets placed opposite to each other, and each formed of a continuous band of metal from pole to pole, avoiding yoke joints, and uniting bridging-pieces connecting similar poles of said field-magnets together, but at a fixed distance apart, and end frames bolted to the polar ends to hold all of the parts rigidly and with a fixed relation to each other.

26. In a dynamo-electric machine or motor, the combination of two U or horseshoe shaped field-magnets arranged with their similar poles in line, and two end frames of non-magnetic material forming standards and firmly secured to the said field-magnets to hold them in a fixed relative position with reference to each other to form a clear armature-space.

27. In a dynamo electric machine or motor, the combination of two U or horseshoe shaped field-magnets arranged with their similar poles in line, two end frames of non-magnetic material forming standards and firmly secured to the said field-magnets to hold them in a fixed relative position with reference to each other to form a clear armature-space, an armature, and an armature-shaft supported in said end frames and independent of the field-magnets.

28. The combination of the two field-magnet cores A A, united by bridging-pieces $b$, frames D D, having supporting-feet and bearings $d$ and bolted at K to the field-magnets, an armature-shaft, F, supported in the bearings, and an armature on the shaft.

29. The combination of the two field-magnet cores A A, united by bridging-pieces $b$, frames D D, having bearings $d$ and bolted at K to the field-magnets, with distance-pieces $k$ to form air-spaces between the end frames and magnets, an armature-shaft, F, supported in the bearings, and an armature on the shaft.

30. The combination of the two field-magnet cores A A, united by bridging-pieces $b$, having extensions E, bolts C, for uniting said bridging-pieces to the polar ends of the magnet-cores, frames D D, having supporting-feet and bearings $d$ and bolted at K to the field-magnets, an armature-shaft, F, supported in the bearings, and an armature on the shaft.

31. In a dynamo-electric machine or motor, the combination, in an armature-core, of the plates H, arranged in circles and parallel rings, with small air-spaces $h'$ between adjacent sections of the same ring, and clamping-bolts I, extending through said sections to unite them into a compact annular cylinder or core.

32. In a dynamo-electric machine or motor, the combination, in an armature-core, of the plates H, having polar extensions $h$, arranged in circles and parallel rings, with small air-spaces $h'$ between adjacent sections of the same ring, and clamping-bolts I, extending through said sections and in line with the polar extensions to unite them into a compact annular cylinder or core.

33. In a dynamo-electric machine or motor, the combination, in an armature core, of the plates H, arranged in circles and parallel rings, with small air-spaces $h'$ between adjacent sections of the same ring, clamping-bolts I, extending through said sections to unite them into a compact annular cylinder or core, and end frames or disks of non-magnetic material, through which the bolts I pass and by which the core is secured to the armature-shaft.

34. In a dynamo-electric machine or motor, field-magnet cores forming a continuous magnetic belt around the armature, having two diametrically-opposite parts brought close to the surface of the armature to form poles and coils upon said parts which are intermediate to the pole parts, said magnetic belt being formed of parts linked together, in combination with non-magnetic frames forming standards secured to said magnetic linked-belt core to hold it rigidly together.

In testimony of which invention I hereunto set my hand.

ANTHONY RECKENZAUN.

Witnesses:
E. M. BRECKINREED,
R. M. HUNTER.